(12) United States Patent
Sands et al.

(10) Patent No.: US 7,059,467 B2
(45) Date of Patent: Jun. 13, 2006

(54) CONVEYOR BELT ASSEMBLY

(75) Inventors: Jeffrey L. Sands, Freeport, IL (US); Ronald J. Glavan, Rockton, IL (US); Henry Thomas Ewald, Roselle, IL (US); Ronald J. Dorsten, Oak Park, IL (US); Curtis J. Scadden, Madison, WI (US); Richard J. Lunden, Brimfield, MA (US)

(73) Assignees: McDonald's Corporation, Oak Brook, IL (US); Carrier Commercial Refrigeration Inc., Charlotte, NC (US)

( * ) Notice: Subject to any disclaimer, the term of this patent is extended or adjusted under 35 U.S.C. 154(b) by 220 days.

(21) Appl. No.: 10/725,957

(22) Filed: Dec. 2, 2003

(65) Prior Publication Data
US 2005/0115804 A1    Jun. 2, 2005

(51) Int. Cl.
*B65G 15/60*    (2006.01)
(52) U.S. Cl. ............ 198/840; 198/821; 198/806; 198/606
(58) Field of Classification Search ............ 198/806, 198/845, 840, 821, 606, 608
See application file for complete search history.

(56) References Cited

U.S. PATENT DOCUMENTS

| | | | | |
|---|---|---|---|---|
| 3,082,858 A | * | 3/1963 | King | 198/841 |
| 3,980,174 A | * | 9/1976 | Conrad | 198/835 |
| 4,140,485 A | * | 2/1979 | Silverman | 432/239 |
| 5,369,477 A | * | 11/1994 | Foote et al. | 399/102 |
| 5,431,289 A | * | 7/1995 | Hoffman | 209/638 |
| 5,431,613 A | * | 7/1995 | Singleton et al. | 482/54 |
| 5,441,458 A | * | 8/1995 | Rogus | 474/189 |
| 5,507,382 A | * | 4/1996 | Hartwell et al. | 198/837 |
| 6,352,150 B1 | * | 3/2002 | Lewis | 198/846 |
| 6,561,344 B1 | * | 5/2003 | Basse | 198/844.1 |
| 6,719,123 B1 | * | 4/2004 | Jackson et al. | 198/626.1 |

OTHER PUBLICATIONS

International Search Report dated Mar. 25, 2005.

* cited by examiner

*Primary Examiner*—Douglas Hess
(74) *Attorney, Agent, or Firm*—Carlson, Gaskey & Olds

(57) ABSTRACT

A conveyor belt assembly includes a conveyor belt to move an item, a drive pulley driven by a motor and a non-drive pulley. The conveyor belt includes a v-belt on the inner surface of the conveyor belt proximate to both of the edges. Each v-belt is received in a groove in the drive pulley and the non-drive pulley. The engagement of the v-belts in the grooves prevent lateral movement of the conveyor belt during use. The conveyor belt also includes an edge seal positioned around both the opposing edges of the conveyor belt. Alternately, the conveyor belt assembly includes two conveyor belts assemblies pressed together and separated by a gap.

19 Claims, 2 Drawing Sheets

CONVEYOR BELT ASSEMBLY

BACKGROUND OF THE INVENTION

The present invention relates generally to a conveyor belt used to move items that includes a v-belt to prevent lateral movement of the conveyor belt.

Conveyor belts are used in various settings, such as retail stores to move merchandise, air ports to move luggage, and factories to move parts from one location to another. Conveyor belts have also been employed in grills to cook food. The food is manually placed on the conveyor belt by an operator. As the conveyor belt travels over a heater positioned under the conveyor belt, the food is cooked.

As a conveyor belt moves, the conveyor belt may move laterally and slide off of the pulleys. Devices have been used in the prior art to adjust the tension of the conveyor belt to provide for proper tension. Adjustment mechanisms have been used to prevent lateral movement of the conveyor belts. A drawback to prior adjustment mechanisms is that they are complex. A sensor is needed to detect when the conveyor belt is moving laterally from the pulleys. The adjustment mechanism then moves the conveyor belt to the proper position.

Hence, there is a need in the art for a conveyor belt that does not move laterally and slide off the pulleys and does not need a complex adjustment mechanism.

SUMMARY OF THE INVENTION

A conveyor belt assembly includes a conveyor belt moveable over a surface to move an item. The conveyor belt assembly includes a drive pulley and a non-drive pulley. The drive pulley is driven by a drive motor to move the conveyor belt over the surface.

The conveyor belt includes a v-belt on the inner surface of the conveyor belt and proximate to each of the edges of the conveyor belt. The v-belt extends continually around the entire inner surface of the conveyor belt. Each v-belt is received in a groove in the drive pulley and the non-drive pulley. The engagement of the v-belts in the grooves prevent lateral movement of the conveyor belt during use of the conveyor belt assembly. The conveyor belt also includes an edge seal positioned around both the edges of the conveyor belt that extends continually around the outer edges of the conveyor belt.

Alternately, the conveyor belt assembly includes two conveyor belts assemblies separated by a gap. In this embodiment, the edge seals of the two conveyor belts contact at a contact point, creating a seal that prevents material in the gap from leaking.

These and other features of the present invention will be best understood from the following specification and drawings.

BRIEF DESCRIPTION OF THE DRAWINGS

The various features and advantages of the invention will become apparent to those skilled in the art from the following detailed description of the currently preferred embodiment. The drawings that accompany the detailed description can be briefly described as follows.

DETAILED DESCRIPTION OF THE PREFERRED EMBODIMENT

Figure 1:
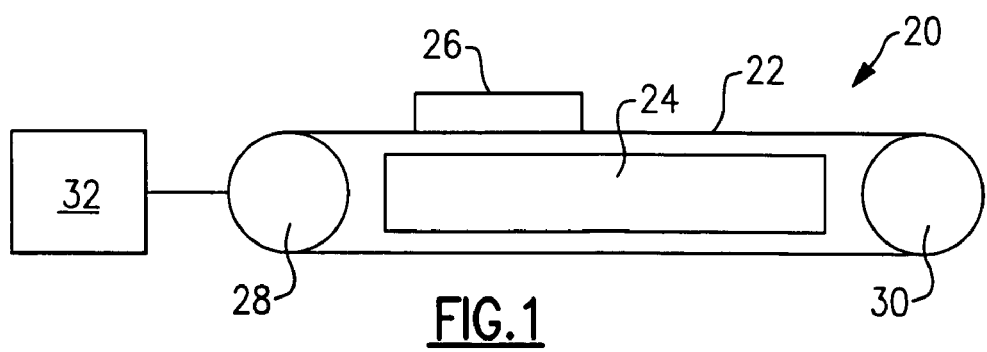
FIG. 1 schematically illustrates a side view of the conveyor belt assembly of the present invention.

FIG. 1 schematically illustrates the conveyor belt assembly 20 of the present invention. The conveyor belt assembly 20 includes a conveyor belt 22 moveable over a surface 24 to move an item 26. The conveyor belt assembly 20 includes a drive pulley 28 and a non-drive pulley 30. The drive pulley 28 is driven by a drive motor 32 to move the conveyor belt 22 over the surface 24.

Figure 2:
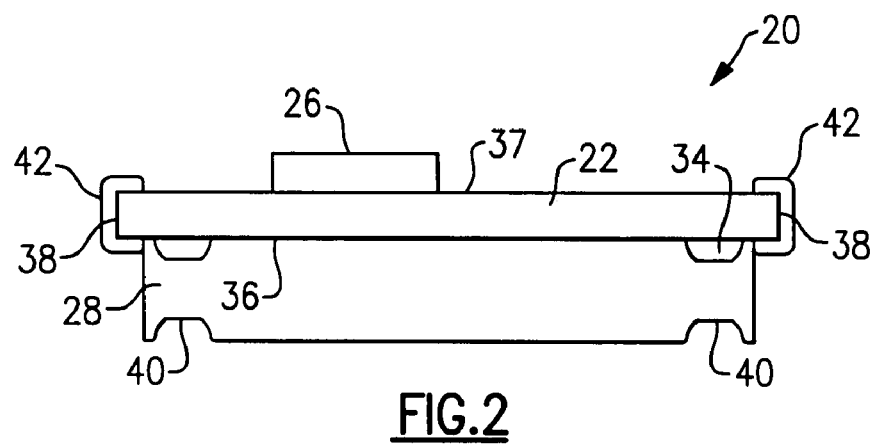
FIG. 2 schematically illustrates a cross-sectional view of the conveyor belt assembly of the grilling component.

FIG. 2 schematically illustrate a cross-sectional view of the drive pulley 28 and the conveyor belt 22. Although only the drive pulley 28 is illustrated and described, it is to be understood that the non-drive pulley 30 operates is a similar manner and includes the same features.

The conveyor belt 22 includes a v-belt 34 on the inner surface 36 of the conveyor belt 22. Preferably, there is a v-belt 34 proximate to each of the opposing edges 38 of the conveyor belt 22. In one example, the v-belts 34 are secured to the conveyor belt 22 by an adhesive. The v-belts 34 extend continually around the entire inner surface 36 of the conveyor belt 22. That is, the v-belts 34 are endless members.

Each v-belt 34 is received in a groove 40 in the drive pulley 28. Each v-belt 34 is also received in a groove 40 in the non-drive pulley 30 (not shown). The grooves 40 are sized and shaped to receive the v-belts 34, retaining the conveyor belt 22 on the pulleys 28 and 30. The engagement of the v-belts 34 in the grooves 40 prevent lateral movement of the conveyor belt 22 during operation of the conveyor belt assembly 20. Preferably, both the v-belts 34 and the grooves 40 have a trapezoidal shape. However, it is to be understood that other shapes are possible.

Figure 3:
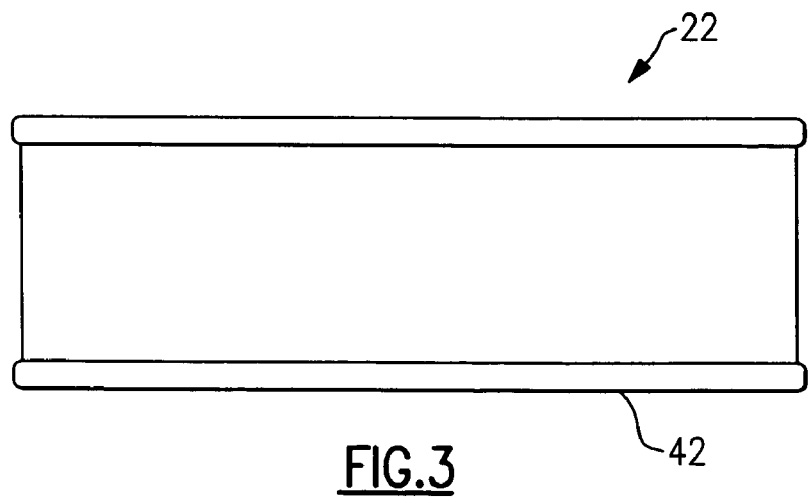
FIG. 3 schematically illustrates a top view of the conveyor belt of the present invention.

The conveyor belt 22 also includes an edge seal 42 positioned on and around both the opposing edges 38 of the conveyor belt 22, as further shown in FIG. 3. The edge seals 42 contact the inner surface 36 and the outer surface 37 of the conveyor belt 22. The edge seals 42 prevent material on the surface of the conveyor belt 22 from leaking or spilling from the surface. The edge seals 42 extend around the entire outer edge 38 of the conveyor belt 22. That is, the edge seals 42 are endless members. As shown in FIG. 2, a space 50 exits between the edge seals 42 and each v-belt 34, and the edge seal 42 and the v-belt 34 are separate components.

In one example, the conveyor belt 22 can be used on a grill or heating component that cooks food. As the food passes travels along the conveyor belt 22, the food is cooked by a heating element. The edge seal 42 prevents any grease that forms during cooking from spilling off of or leaking from the surface of the conveyor belt 22.

If the conveyor belt 22 is used with a grill, the conveyor belt 22 is preferably made of any suitable material having a low coefficient of thermal expansion. In one example, the conveyor belt 22 is made of non-stick coated Invar™ commercially available from Imphy S.A. Corporation of Paris, France. Invar™ is a metal alloy comprised of Iron and 36% Nickel, and may include other trace elements. In one example, the non-stick coating on the Invar™ is Teflon™ commercially available from E. I. DuPont Nemours and Company Corporation of Wilmington, Del. Invar has a low constant of thermal expansion and therefore expands very little when heated. Although Invar™ has been disclosed, it is to be understood that other materials having a low coefficient of thermal expansion can be used.

Figure 4:
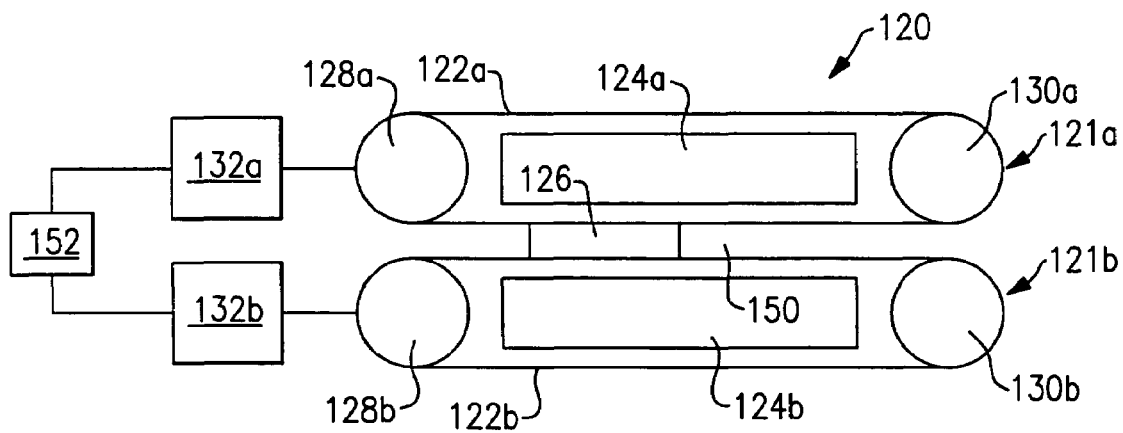
FIG. 4 schematically illustrates an alternate embodiment of the conveyor belt assembly of the present invention.

FIG. 4 schematically illustrates an alternate embodiment of the conveyor belt assembly 120 including two conveyor belts assembly 121a and 121b separated by a gap 150. Each conveyor belt 122a and 122b is moveable over a surface 124a and 124b, respectively.

Each conveyor belt assembly 121a and 121b includes a drive pulley 128a and 128b, respectively, and a non-drive pulley 130a and 130b, respectively. The drive pulleys 128a and 128b are powered by respective drive motors 132 and 132b to move the respective conveyor belts 122a and 122b. A drive controller 152 provides a control signal to the drive motors 132a and 132b to synchronize the speed of the conveyor belts 122a and 122b. An item 126 travels in the gap 150 between the conveyor belt assemblies 121a and 121b.

Figure 5:
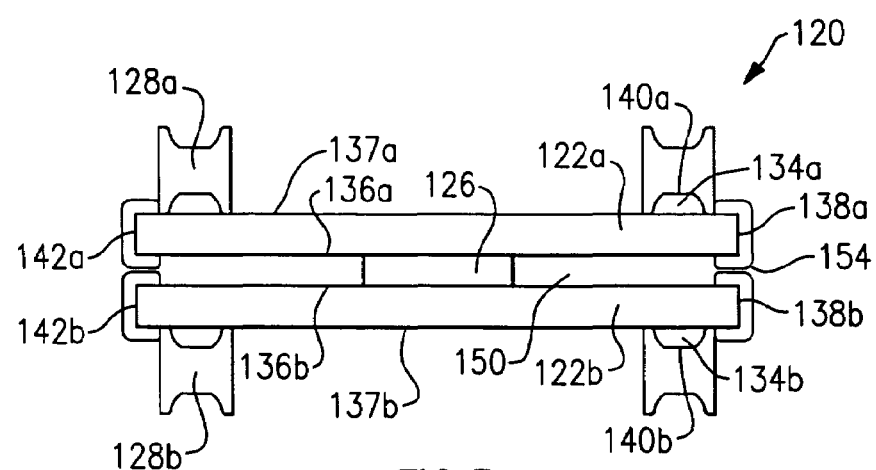
FIG. 5 schematically illustrates a cross-sectional view of the alternate embodiment of conveyor belt assembly of the present invention.

FIG. 5 schematically illustrates a cross-sectional view of the conveyor belts 122a and 122b, respectively, of the conveyor belt assembly 120. Each conveyor belt 122a and 122b includes a v-belt 134a and 134b, respectively, proximate to both of the opposing edges 138a and 138b of the respective conveyor belt 122a and 122b. The v-belts 134a and 134 extend continually around the entire inner surface 136a and 136b, respectively, of the conveyor belts 122a and 122b. That is, the v-belts 134a and 134b are endless members.

Each v-belt 134a and 134b is received in a respective groove 140a and 140b of the drive pulley 128a and 128b, respectively, and a groove (not shown) in the non-drive pulley 130a and 130, respectively. The grooves 140a and 140b are sized and shaped to receive the v-belts 134a and 134, respectively, and retain the conveyor belts 122a and 122b on the pulleys 128a, 128b, 130a and 130b. The engagement of the v-belts 134a and 134b in the grooves 140a and 140b prevent lateral movement of the conveyor belt 122a and 122b during use of the conveyor belt assembly 120. Preferably, both the v-belts 134a and 134b and the grooves 140a and 140b have a trapezoidal shape. If the conveyor belt assemblies 122a and 122b are used with a grilling component, the v-belts 134a and 134b also prevent grease and water in the gap 150 from migrating to the outer surfaces 137a and 137b of the conveyor belts 122a and 122b.

Each conveyor belt 122a and 122b also includes an edge seal 142a and 142b, respectively, positioned around both the opposing edges 138a and 138b, respectively, of the respective conveyor belt 122a and 122b. The edge seals 142a and 142b also contact the inner surface 136a and 136b and the outer surface 137a and 137b of the conveyor belts 122a and 122b. The edge seals 142a and 142b are endless members.

When the conveyor belt assemblies 122a and 122b are pressed together, the edge seals 142a and 142b contact at a contact point 154, creating a seal that prevents the leakage of material from the gap 150 or into the gap 150. If the conveyor belt assemblies 122a and 122b are used with a grilling component, the edge seals 142a and 142b prevent steam, vapor and grease from the gap 150 from escaping into the surrounding air.

The conveyor belt assembly 120 can be used with a grill, such as a vertical grill described in co-pending patent application Ser. No. 10/124,629 entitled "Automated Grill" filed on Apr. 17, 2002. The conveyor belt assembly 120 can also be used with a grilling component, such as described in co-pending patent application Ser. No. 10/726,017 entitled "Grilling Component" filed on Dec. 2, 2003.

The foregoing description is only exemplary of the principles of the invention. Many modifications and variations are possible in light of the above teachings. It is, therefore, to be understood that within the scope of the appended claims, the invention may be practiced otherwise than using the example embodiments which have been specifically described. For that reason the following claims should be studied to determine the true scope and content of this invention.

What is claimed is:

1. An endless member assembly comprising:
    an endless member having an inner surface, an outer surface, a first edge and a second edge;
    a belt secured on said inner surface of said endless member; and
    a seal located on one of said first edge and said second edge, wherein said seal and said belt are separate components that are not in contact with each other.

2. The endless member assembly as recited in claim 1 wherein said endless member is a conveyor belt.

3. The endless member assembly as recited in claim 1 wherein said endless member is a metal alloy including Iron and approximately 36% Nickel.

4. The endless member assembly as recited in claim 3 wherein said endless member further includes a non-stick coating.

5. The endless member assembly as recited in claim 1 further including a drive pulley having a drive pulley groove and a non-drive pulley having a non-drive pulley groove, and said belt is received in at least one of said drive pulley groove and said non-drive pulley groove.

6. The endless member assembly as recited in claim 5 wherein said at least one of said drive pulley groove and said non-drive pulley groove is substantially trapezoidal, and said belt is substantially trapezoidal.

7. The endless member assembly as recited in claim 1 wherein said belt is proximate to said one of said first edge and said second edge.

8. The endless member assembly as recited in claim 1 wherein said belt comprises two belts, and one of said two belts is proximate to said first edge and the other of said two belts is proximate to said second edge.

9. The endless member assembly as recited in claim 1 wherein said seal comprises two seals, and one of said two seals is located on first edge and the other of said two seals is located on said second edge.

10. The endless member assembly as recited in claim 1 wherein a space exists between said belt and said seal.

11. The endless member assembly as recited in claim 1 further including a heater that heats the endless member.

12. An endless member assembly comprising:
    a first endless member assembly including a first endless member having a first inner surface, a first outer surface, and a pair of first edges, two first belts attached on said first inner surface of said first endless member, and one of said two first belts is proximate to each of said pair of first edges, two first seals, and one of said two first seals is located on each of said pair of first edges, a first drive pulley to drive said endless member, and a first non-drive pulley;
    a second endless member assembly including a second endless member having a second inner surface, a second outer surface, and a pair of second edges, two second belts attached on said second inner surface of said second endless member, and one of said two second belts is proximate to each of said pair of second edges, two second seals, and one of said two second seals is located on each of said pair of second edges, a second drive pulley to drive said endless member, and a second non-drive pulley; and a gap between said first endless member assembly and said second endless member assembly to contain an item, wherein said two first seals of said first endless member and said two second seals of said second endless member contact at a sealing surface.

13. The endless member assembly as recited in claim 12 wherein said first endless member and said second endless member are a conveyor belt.

14. The endless member assembly as recited in claim 12 wherein said first two belts are each proximate to one of said pair of first edges and said second two belts are each proximate to one of said pair of second edges.

15. The endless member assembly as recited in claim 12 wherein said first drive pulley further includes a first drive groove and said second drive pulley further includes a second drive groove.

16. The endless member assembly as recited in claim 12 wherein said first non-drive pulley further includes a first non-drive groove and said second non-drive pulley further includes a second non-drive groove.

17. The endless member assembly as recited in claim 16 wherein said two first belts engage said first drive groove and said first non-drive groove, and said two second belts engage said second drive groove and said second non-drive groove.

18. The endless member assembly as recited in claim 12 further including a first heater that heats said first endless member and a second heater that heats said second endless member.

19. The endless member assembly as recited in claim 12 wherein each of said two first seals and said first two belts are separate components and each of said two second seals and said second two belts are separate components.

* * * * *